United States Patent [19]

Yamashita

[11] 3,952,563

[45] Apr. 27, 1976

[54] LOCK ASSEMBLY

[75] Inventor: Saburo Yamashita, Takarazuka, Japan

[73] Assignee: Kyo-ei Industrial Corporation, Japan

[22] Filed: Aug. 12, 1974

[21] Appl. No.: 496,630

[30] Foreign Application Priority Data

Nov. 21, 1973 Japan .............................. 48-131516

[52] U.S. Cl. .................................... 70/232; 70/259; 70/276

[51] Int. Cl.$^2$ .................... E05B 35/14; E05B 47/00; E05B 65/12; F16B 41/00

[58] Field of Search ............. 70/231, 232, 259, 260, 70/276

[56] References Cited

UNITED STATES PATENTS

| | | | |
|---|---|---|---|
| 1,625,901 | 4/1927 | Lay | 70/232 |
| 1,900,146 | 3/1933 | Winkler | 70/232 |
| 3,566,636 | 3/1971 | Rudolf et al. | 70/276 |
| 3,602,020 | 8/1971 | Kajita | 70/276 |
| 3,744,833 | 7/1973 | Berducone | 70/276 X |
| 3,782,146 | 1/1974 | Franke | 70/232 |
| 3,837,195 | 9/1974 | Pelto | 70/276 |

*Primary Examiner*—Paul R. Gilliam
*Assistant Examiner*—Carl F. Pietruszka
*Attorney, Agent, or Firm*—Seymour Rothstein

[57] ABSTRACT

A lock assembly useful in coupling a tire assembly to a wheel which is locked and unlocked by a magnetic key.

7 Claims, 7 Drawing Figures

LOCK ASSEMBLY

BACKGROUND OF THE INVENTION

This invention relates to a lock assembly to couple a tire and wheel assembly, as mounted on a vehicle, such as an automobile, in a manner to ensure safety against theft.

Deluxe automobiles often include the mounting of expensive tires and wheels on the automobile. Thieves direct their attention to these expensive items and theft thereof is frequent. Heretofore, for safety against theft, car drivers have generally used key inserted or activated cylinder locks which are applied to the locking bolts or nuts of the wheel. These key activated devices have the drawback of being easily unlocked or "picked" by hair pins or the like.

BRIEF SUMMARY OF THE INVENTION

An object of this invention is to remove the "picking" drawback from the locks and to provide cylinder locks activated by magnetic force. The lock of the present invention has no key hole to ensure against theft of the tire and wheel by use of not only hair pins or the like, but by commercially available magnets.

According to this invention, a wheel bolt or nut is covered by a conical shell loosely and rotatably mounting above the entire periphery of the bolt or nut so that the loose rotatable shell cannot be grasped by any tool such as a spanner wrench or other device. As a result, a wrench, etc., cannot directly contact the bolts or nuts for removal. One can manipulate the lock assembly of the present invention only by use of a magnet key having a predetermined configuration.

DETAILED DESCRIPTION OF THE DRAWINGS

Figures 1, 2, 3, 4, 5, 6, 7:
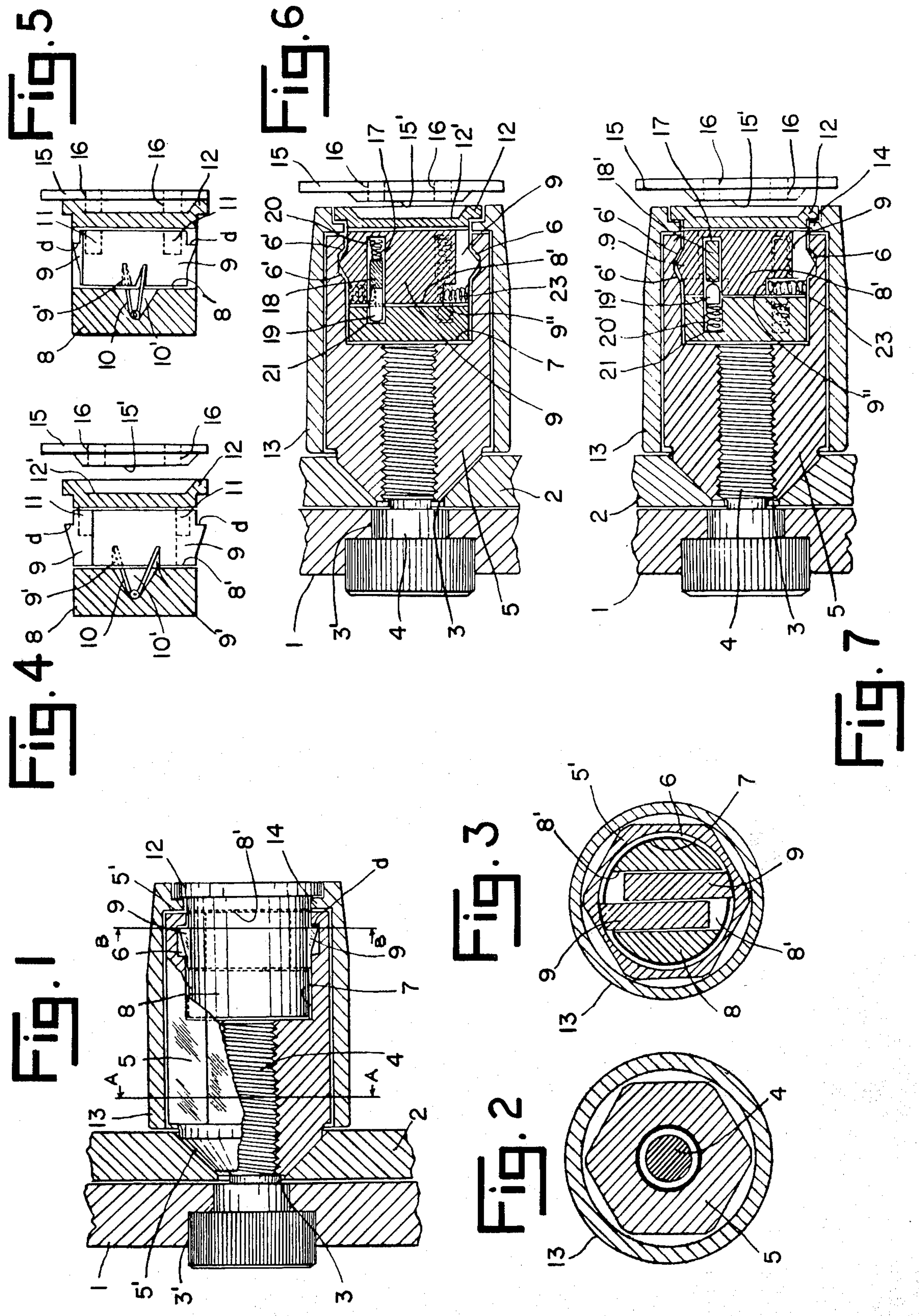
FIG. 1 is a longitudinal side partial sectional view of one embodiment of the present invention.
FIG. 2 is a section view taken on the line A—A of FIG. 1.
FIG. 3 is a section view taken on the line B—B of FIG. 1.
FIG. 4 is a longitudinally enlarged side section view of the cylinder lock body of FIG. 1 under a locked condition.
FIG. 5 is a view similar to FIG. 4 of the lock of FIG. 1 under an unlocked condition.
FIG. 6 is a longitudinal side partial sectional view of a second embodiment according to the present invention.
FIG. 7 is a longitudinal side partial sectional view of a third embodiment according to the present invention.

Referring to FIGS. 1–3, in the accompanying drawings, mating apertures 3 and 3′ are bored on the side of wheel suppo t 1, and wheel 2. Wheel support 1 and wheel 2 are clamped together by a bolt passing through apertures 3, 3′ having a hexagonal nut 5 threaded on the end of the bolt. The hexagonal nut 5 has a tapered portion 5′ at the rear end thereof corresponding to the tapered aperture 3 of wheel 2. It should be pointed out, however, that the means for coupling the wheel 2 are not limited to the nut 5 for fixed screw or stud bolt 4. For example, it is possible in the other embodiment to substitute such a bolt head for the end nut 5.

Nut 5 has a room or cavity 7 in the forward interior portion of the nut. An inner groove 6 is bored on the periphery of cavity 7. The cavity or room 7 accomodates a cylinder lock body 8, which includes a pair of latch bars 9, 9 normally thrust in an up and down position to latch with groove 6 thereby performing a locking function.

A cylindrical or conical shell 13, having an inner peripheral lug 14 in the forward interior thereof, is loosely and rotatably mounted about the outer periphery of nut 5. The rear side of peripheral lug 14 abuts with the front side of hexagonal nut 5. The cylinder lock body 8 also includes a collar 12, the front side of which defines a key receiving recessed member 12′ (FIG. 4) to serve in engaging the peripheral lug 14 in the interior of shell 13, so that shell 13 cannot be separated from the cylinder lock body 8 when the lock is in a locked condition.

The cylinder lock body 8 also includes a hollow section 8′ across the axis thereof. A pair of latch bars 9, 9 are positioned within hollow section 8 and are normally thrusted up and down by suitable spring means. Various forms of such spring means can be devised by those trained in the art.

According to the first embodiment of the present invention, as shown in FIG. 4 wherein a longitudinally enlarged side section of a cylinder lock body 8 is illustrated, a cavity 10′ is bored on the rear and inner side walls of cylinder lock body 8 to accomodate spring 10. The two legs of spring 10 are held in slots 9′, 9′ of the latch bars 9, 9. In this embodiment, latch bars 9, 9 are normally thrusted up and down upon expansion of legs 9′, 9′ and latch the grooves of nut 5 with their respective tips. Under this condition, the cylinder lock body is locked in the interior of nut 5. Accordingly, the shell 13 also cannot be removed, because its peripheral lug 14 is interposed between the collar 12 of cylinder lock body 8 and the front side of nut 5.

To unlock the lock of FIG. 4, magnet pieces 11, embedded in the upper and lower part of the respective latch bars 9, 9 as shown best in FIG. 4, are activated by a key 15 having a front convex member 15′ which snugly fits into the front recessed member of cylinder lock body 8. A magnet piece 16 is embedded in a front convex member 15′. In this embodiment, key 15 is brought in contact with the front recessed member 12′ of cylinder body lock 8, as shown in FIG. 5 thereby drawing the tip of latch bars 9, 9 from the groove 6 into the inner hollow portion 8′ of cylinder lock body 8 by magnetic attraction of two side magnet pieces 11 and 16, each opposed to the other, while latch bars 9, 9 overcome force imposed by spring 10 when under compression. The key 15 can be then pulled forward together with the shell 13 and cylinder lock body 8 to separate them from each other. When the shell is uncovered, the nut 5 is exposed and grasped by a tool such as a spanner for replacement of the tire and wheel.

When it is desired to lock the tire and wheel together, the shell 13 is mounted over the nut 5 and the cylinder lock body 8 is pushed into the interior of both nut 5 and shell 13. During this operation, the tips of the thrusted latch bars 9, 9 are slidingly introduced into body 8 since their inclined side allow the bars 9, 9 to pass the inner peripheral lugs of both shell 13 and nut 5. These tips expand due to the expansion of spring 10, and reach deeply into the groove 6 of nut 5 so that the cylinder lock body is locked in the interior of nut 5. As a result, the shell cannot be separated from the nut. It is understood that the shell cannot be grasped by a tool such as a spanner. In any event, rotary force cannot be transmitted to the nut and the tire and wheel are satisfactorily locked on the automobile.

The locking device shown in FIG. 6 represents a modification of the basic invention. Latch bars 9, 9 have a pin slot 17 bored on the rear side thereof at a height corresponding to magnet piece 16 embedded in key 15. This pin slot 17 extends into a pin receiving cavity 21, correspondingly bored on the rear and inner side wall of cylinder lock body 8 and accommodates a coil spring 20. Spring 20 is deeply positioned in cavity 21 and is in contact with a magnet pin 18 connected to a pin member 19. The respective latch bars 9, 9 are normally thrusted up and down and pin member 19 passes through cavity 21 of cylinder lock body 8 against expanded spring 20 to lock the cylinder body 8 in the interior of nut 5. When in this locked condition, latch bars 9, 9 are thrust additionally by means of a normally expanded coil spring 23 between a position 9'' on the lower side of latch members 9, 9 and the inner periphery of room or cavity 7. The tip of latch bars 9, 9 has two inclined sides. Correspondingly, the inner peripheral groove 6 or nut 5 includes two inclined sides 6', 6'. In this embodiment, key 15 engages the front concave member 12 of cylinder lock body 8, as shown in FIG. 6, to align magnet piece 16 in key 15 with magnet pin 18 in the pin slot 17. As a result of this attraction, pin member 19 with its head moves into the pin slot 17 on the side of latch bars since the magnetic force is strong enough to overcome the force of spring 20. In this aspect, latch bars 9, 9 are relieved from their primary thrust condition and thrusted by means of coil spring 23 alone. Key 15 is then pulled forward. Cylinder lock body 8 and shell 13 together can be removed with key 15, by hand, since the tips of respective latch bars will slidingly move along the inclined side 6' of inner peripheral groove 6 of nut 5. Accordingly, the latch bars 9, 9 are drawn in the interior of cylinder lock body 8, since the force against coil spring 23 is easily overcome. The shell 13 can then be removed thereby exposing nut 5 which can be grasped by a tool such as a spanner. To lock the nut, the shell 13 is loosely mounted about the nut 5 and the cylinder lock body 8 is pushed into the interior of nut 5. Latch members 9, 9 are guided by the sides of their tips and pushed deeply to overcome force against spring 23. When the latch bars reach a determined position, coil spring 23 is again fully expanded thereby placing the latch bars 9, 9 in a thrusted condition. The head of pin members 19 therefore pass into the cavity 21 for completion of the locking operation.

According to another embodiment of this invention, as illustrated in FIG. 7, the coil spring 20 shown in FIG. 6 is changed to a rear position. Pin member 19' and magnet pin 18' are divided and in contact with each other. The magnet portion 16 of key 15 is magnetically opposed to magnet pin 18', i.e., the two identical poles caused a repulsion force. The cavity 21 is bored to accommodate spring 20' in a normally expanded condition. Pin head 19' abuts coil spring 20'. This pin head 19' is normally positioned in both the pin slot 17 and cavity 21 by means of expanded spring 20' to place the latch bars in a forward position. When head 19' is deep within the cavity 21, the spring 20' is under compression. The opposed poles of magnet pin 18' in the cylinder lock body 8 and magnet piece 16 of key 15 are identical to create a repulsion force. The other elements in FIG. 7 are the same as shown in FIG. 6.

In the locking position, shown in FIG. 7, the pin head 19' is positioned across both the pin slot 17 and the cavity 21 by expansion of the spring 20'. To unlock the cylinder lock body 8 from nut 5, the key 15 is positioned as described earlier whereby the magnet pin 18' is repulsed backward by the magnetic piece 16, so that the pin head 19' is deeply repelled into slot 21 and compresses spring 20'. In this position, both latch bars 9, 9 are thrusted by means of coil spring 23 alone. The key 15 and cylinder lock body 8 can be then pulled out forward together.

To use the assembly of FIG. 7 for a locking operation, the loose mounting shell 13 is placed on the nut from the front and the cylinder lock body 8 is pushed into the forward interior 7 of the nut 5, so that the latch bars 9, 9 are thrusted by the expanded spring 23. The pin head 19' passes across both the pin slot 17 and the cavity 21. As discussed earlier, the lock assembly, according to this invention, ensures against the theft of the tire and wheel so long as the shell is loosely mounted around the nut.

Operation of the lock assembly is easy for any person, inasmuch as the key need be applied only to the front side of the cylinder lock body. As a result, the cylinder lock body is no longer in a locked condition, and the loosely mounted shell can be removed to expose the hexagonal nut or bolt head.

What I claim is:

1. A lock assembly having a locked state comprising, in combination:

a magnetic key;

a nut defining a cavity and a peripheral groove about said cavity;

a shell detachably mountable on said nut, said shell being rotatable substantially about said nut in said locked state, whereby access to said nut is substantially avoided;

a locking member adapted to be received by said cavity in said nut, said locking member and said shell cooperating to define engagement means for securing said shell about said nut in said locked state, said locking member including latch means for securing said locking member within said cavity, said latch means being operative in an extended state and a retracted state, bias means for normally biasing said latch means to said extended state and magnetic pin means for selectively locking said latch means in said extended state, said locking member and said latch means defining at least one pin receiving cavity and at least one pin slot, respectively, said pin receiving cavity and said pin slot substantially aligning whenever said latch means is in said extended state, said magnetic pin means being operable in said pin receiving cavity and said pin slot and responsive to said magnetic key, said latch means including at least one tip having inclined sides for engaging said groove in said locked state, said tip and said inclined sides cooperating to define means for overcoming said bias means whenever said latch means is urged against said nut.

2. A lock assembly as claimed in claim 1 wherein said magnetic pin means has a normally operative state and a key-actuated inoperative state, said latch means being locked in said extended state whenever said magnetic pin means is in said normally operative state.

3. A lock assembly as claimed in claim 2 wherein said magnetic pin means includes a magnetic member movably responsive to said magnetic key.

4. A lock assembly as claimed in claim 3 wherein said magnetic pin means further includes a pin member, said pin member extending between said pin receiving cavity and said pin slot in said normally operative state, said pin member being movably responsive to said magnetic member.

5. A lock assembly as claimed in claim 1 wherein said latch means includes a pair of latch bars oppositely biased by said bias means, each of said latch bars including said tip.

6. A lock assembly as claimed in claim 1 wherein said groove in said nut has sloped sides to further facilitate insertion and withdrawal of said locking member.

7. A lock assembly as claimed in claim 1 wherein said engagement means includes an interior lug on said shell and a shoulder on said locking member, said shoulder securingly engaging said interior lug in said locked state.

* * * * *